United States Patent

[11] 3,557,705

[72] Inventors Myron M. Gusse
353 17th St.;
Melvin E. Gusse, Winnebago Heights,
Malone, Rte. #1, Fond Du Lac, Wis. 54935
[21] Appl. No. 800,445
[22] Filed Feb. 19, 1969
[45] Patented Jan. 26, 1971

[54] CONVEYOR SYSTEM FOR AUTOMOTIVE VEHICLES
6 Claims, 8 Drawing Figs.
[52] U.S. Cl. .................................................. 104/172, 104/178
[51] Int. Cl. ..................................................... B61b 13/12, B65g 19/24
[50] Field of Search ........................................... 104/162, 170, 171, 172, 176, 178

[56] References Cited
UNITED STATES PATENTS
| | | | |
|---|---|---|---|
| 3,196,808 | 7/1965 | Senn............................. | 104/173 |
| 3,260,219 | 7/1966 | Vani............................. | 104/172 |
| 3,455,250 | 7/1969 | Enning......................... | 104/172 |

*Primary Examiner*—Arthur L. LaPoint
*Assistant Examiner*—Robert W. Saifer
*Attorneys*—John W. Michael, Gerrit D. Foster, Bayard H. Michael, Paul R. Puerner, Joseph A. Gemignani, Andrew O. Riteris and Spencer B. Michael ABSTRACT: A conveyor system for moving automobiles having an endless coil chain which carries transversely disposed rollers which are adapted to engage the tire of one of the wheels of an automobile and to impart rotational movement thereto. The chain is engaged by driving and idler sprockets at the exit and entrance ends of the conveyor, with the sprockets being positioned below and at an oblique angle to the floor of the installation and with the power and return sides of the chain being located at floor level.

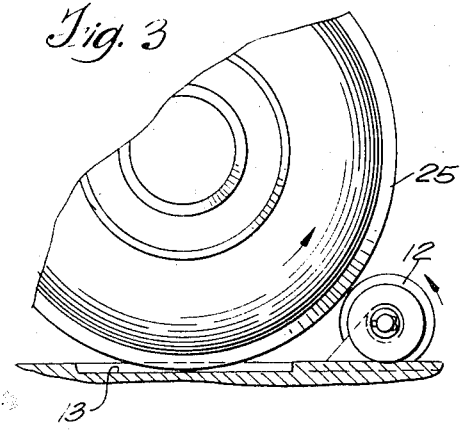
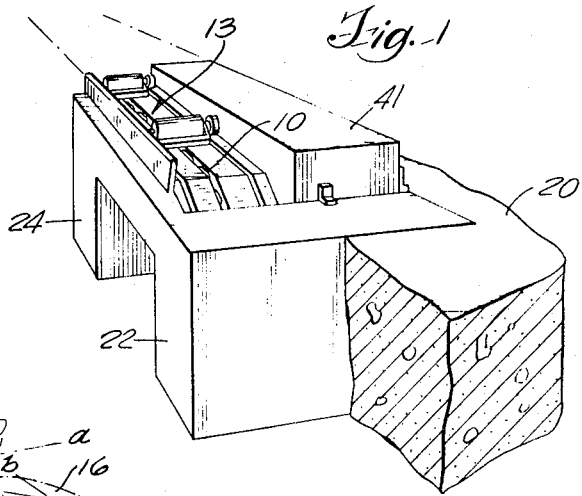
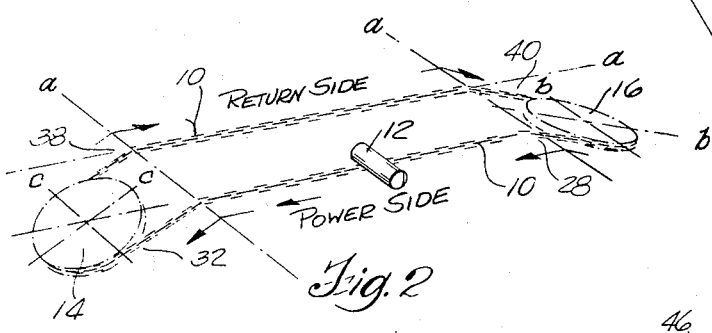
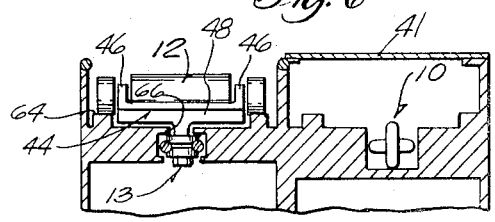
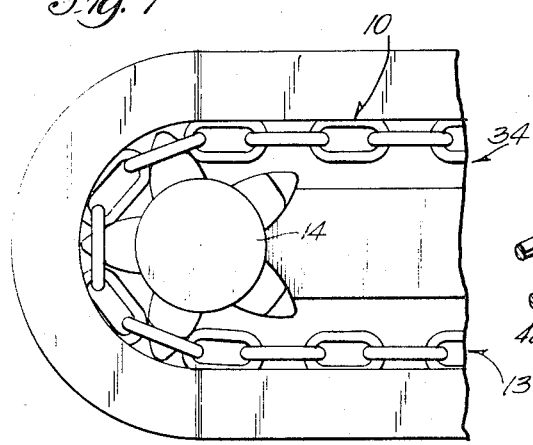
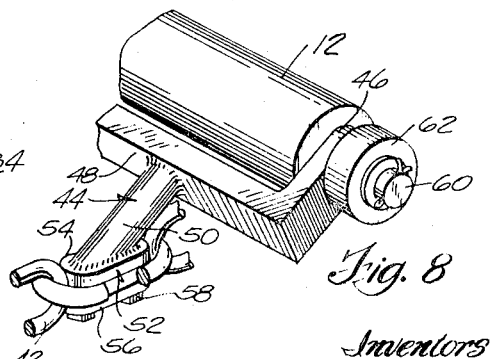

CONVEYOR SYSTEM FOR AUTOMOTIVE VEHICLES

BACKGROUND OF THE INVENTION

1. Field of the Invention

This invention pertains to conveyor systems of the type which employ a roller or similar means which comes into contact with the tire of one of the wheels of a vehicle and advances the vehicle by imparting rotational movement to the wheels. Conveyor systems of this type may be classified as hookless conveyor systems and are predominantly used in car wash installations; however, they also do find application in automatic parking ramps and similar systems.

2. Description of Prior Art

Hookless conveyor systems which have existed prior to the present invention may be classified into vertically disposed chain drives and horizontally disposed chain drives.

The vertically disposed chain drives employ an endless block or roller chain which carries spaced wheel engaging rollers usually connected to the chain by a yoke or similar structure which locates the rollers transversely to and above the chain. The chain extends between two vertically positioned sprockets which are positioned at the entrance and the exit ends of the conveyor. The power side of the conveyor travels at the floor level of the installation with the rollers engaging one of the tires of the automobile just slightly above floor level. The return side of the conveyor chain is located in a trench below the power side of the conveyor.

The horizontally disposed prior art conveyor systems also employ an endless block or roller chain. The chain extends between horizontally positioned sprockets at the entrance and the exit ends of the system and the power side as well as the return side of the chain are usually at floor level. In a system of this type, the chain carries rollers which travel at floor level of the installation and which extend sidewardly and radially outwardly in respect to the looped path of the chain.

Both prior art conveyor systems have certain disadvantages. The principal disadvantage of the vertical systems is that they require a trench which extends for the entire length of the conveyor. This requirement is a particular disadvantage in those cases where a conveyor system has to be installed on an already existing foundation as well as in cases where a conveyor system has to be installed on a temporary basis.

Since the horizontally disposed systems have a floor-level return side, a trench is not required. However, the serious and inherent disadvantage of these systems is that the rollers extend radially outwardly in respect to the chain and, thus, exert a substantial moment force on the chain at the point of connection between the roller and the chain. Various outrigger brackets have been employed in attempts to distribute the force over a segment of the chain; however, it is believed that the cumbersome efforts which have been attempted do not overcome the inherent deficiency of the conveyor.

SUMMARY OF INVENTION

The principal object of the present invention is to avoid the requirement of a trench which has been required underneath the entire conveyor of the prior art vertical conveyor systems as well as to avoid the inherent unfavorable force distribution of the chain drives of the prior art horizontal conveyor systems.

This objection is attained by employing a coil chain which has the inherent property of being multidirectionally flexible and, thus, permits the conveyor chain to deflect in the vertical as well as the horizontal planes.

This feature permits the floor-level location of the chain during its power and return paths and permits the chain to deflect downwardly to downwardly slanting drive and idling sprockets which are positioned below floor level at the exit and entrance ends of the conveyor. The floor-level location of the return path, of course, eliminates the extended trenches which were required with prior art vertical systems. Further, the multidirectional flexibility of the chain permits the use of rollers which are positioned transverse to and centered in respect to the chain and, thus, do not pose the unfavorable loading problems which have been encountered with prior art horizontal conveyor systems.

DESCRIPTION OF THE DRAWINGS

FIG. 1 is a perspective view of the conveyor installation embodying the present invention with the view being from the entrance end of the conveyor and with portions of the floor structure being broken away for the purposes of illustration;

FIG. 2 is a schematic diagram of the path of the conveyor chain;

FIG. 3 is a side view of the conveyor roller illustrating its engagement with a tire;

FIG. 6 is a cross-sectional view taken on line 6-6 of FIG. 5;

FIG. 7 is a plan view of the drive sprocket taken on line 7-7 of FIG. 5; and

FIG. 8 is a fragmentary perspective view of the drive roller and its connecting structure to the conveyor chain with a portion of the chain being broken away for sake of illustration.

DESCRIPTION OF PREFERRED EMBODIMENT

Figure 4:
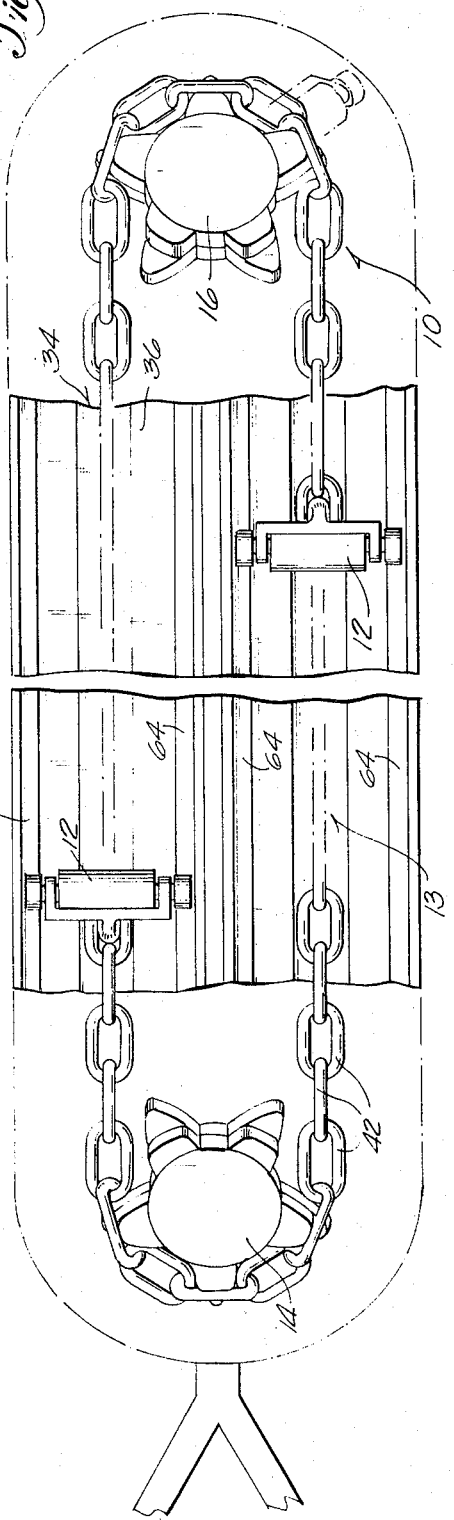
FIG. 4 is a fragmentary top plan view of the conveyor installation with portions being broken away for the sake of illustration.
Figure 5:
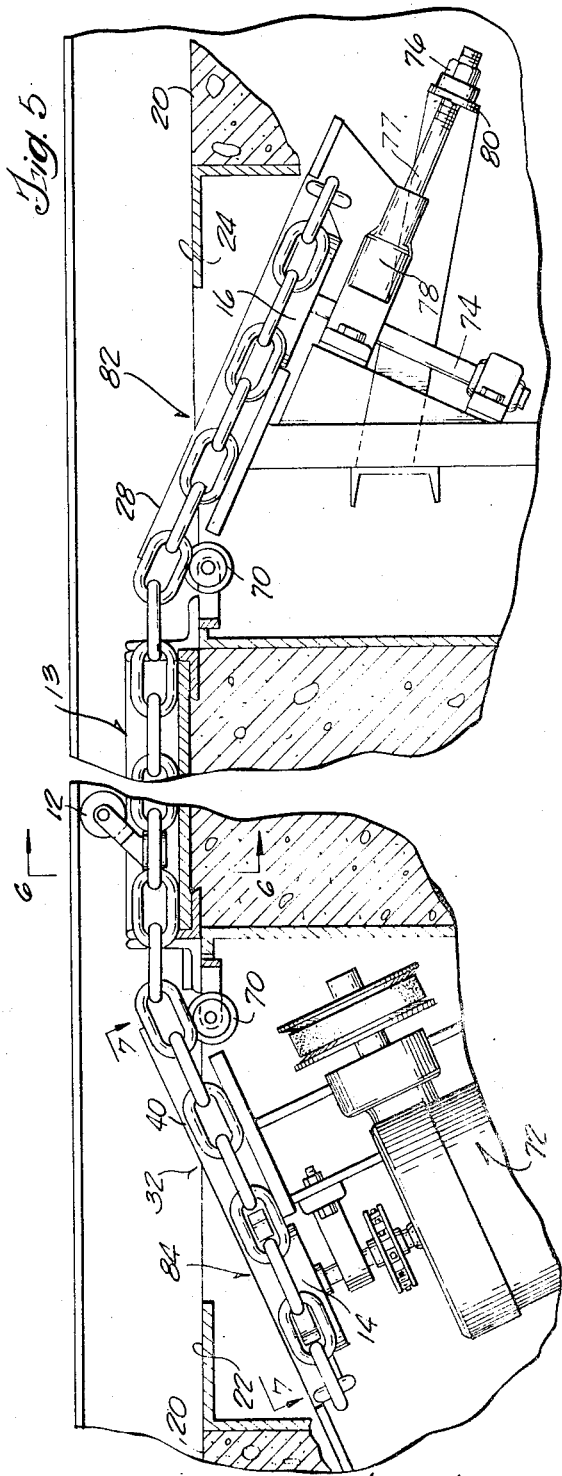
FIG. 5 is a fragmentary side plan view of the installation with portions being broken away and shown in cross section for the sake of illustration.

The operation and the major components of the conveyor embodying the present invention can be best appreciated by first referring to FIGS. 1 and 2 which illustrate a conveyor installation for a car wash or similar application wherein an automobile has to be automatically conveyed from one location to another.

The conveyor is comprised of an endless coil chain 10 which carries a number of transversely disposed rollers 12 positioned in a guide track 13 above the chain. The chain is engaged by a drive sprocket 14 at the exit end of the conveyor and by an idler or tensioning sprocket 16 at the entrance of the conveyor. The drive and idler sprockets are positioned below the generally horizontal plane of the floor 20 of the installation and lie in planes which are at an oblique angle to the floor. The sprockets are contained in drive and idler housings 22 and 24 respectively.

As illustrated in FIG. 2, the chain and its associated rollers travel in a closed loop path. The path may be defined by parallel power and return sides which lie generally in the horizontal plane of the floor 20, defined by coordinates a-a in FIG. 2, and by open loop sections at the entrance and exit points which lie in inclined planes defined by coordinates b-b and c-c, respectively. As the roller 12 ascends in plane b-b from sprocket 16, it moves into plane a-a where it is in a position to contact the tire 25 of a vehicle which has been driven onto the entrance end of the conveyor. Upon further movement of the chain, the roller remains in contact with the tire, causing the same to rotate, as shown in FIG. 3, and thus advances the vehicle through the power side of the loop. Upon reaching the exit end of the conveyor, the roller descends along the open loop of plane c-c and, thus, disengages itself from the tire. Thereafter, the roller passes around sprocket 14 and is returned in an unloaded state along the return side of the loop to the open loop section of plane b-b where it passes around sprocket 16 and is again returned to the power side of the loop.

On the power side the chain 10 travels below the guide track 13 which serves as a support for two wheels of the vehicle which is advanced by the conveyor. The guide track has an ascending ramp 28 and a descending ramp 32 at the entrance and exit ends, respectively. The chain is returned through a return track 34 which has a main horizontal portion 36 and ascending and descending ramps 38 and 40. The return track is shielded by a housing 41. The chain 10 as it travels through guide track 13 and the return track 34 is positioned at the floor level of the installation.

The coil chain 10 is comprised of a number of interlocking links 42 and has the inherent property of being multidirectionally flexible, a property which is not found in block, roller and inverted tooth chains which are normally employed for power transmission. Because of this property the chain 10 can freely flex in its vertical plane as it moves from the generally horizontal plane of the power and return sides of the loop to the planes of the sprockets as well as in its horizontal plane as it passes around the sprockets. The multidirectional flexibility is of prime importance in the basic design of the conveyor since it permits the location of the guide and return tracks at the floor 20 of the installation and only requires fairly small excavations for the idler and drive housings 24 and 22 at the entrance and exit ends of the conveyor installation. The reason for positioning the sprockets below floor level is to permit engagement of the tire by an ascending roller and to permit disengagement by a descending roller.

Each of the rollers 12 is connected to the chain 10 by a yoke 44 which is comprised of two upwardly extending arms 46 which carry the roller, a web portion 48, and a downwardly extending central leg 50 which has a foot 52 projecting through the central aperture of a horizontally positioned chain link 42. The foot has sidewardly extending flanges 54 which engage the top surface of the link. A holding plate 56 is attached to the foot by bolts 58 and engages the bottom surface of the link as shown in FIG. 8.

The roller 12 is carried on an axle 60 which projects on both of its ends through appropriate apertures in the arms 46. The portions of the axle which extend past the arms 46 carry small wheels 62 which are adapted to ride on slightly elevated rails 64 provided on each side of the guide and return tracks 13 and 34. The leg 50 extends through a central slot 66 of the guide track.

The teeth of the drive and idler sprockets 14 and 16 engage the vertically disposed links of the chain and, thus, permit the yokes and their associated rollers to pass around the sprockets without interference. Suitable guide rollers 70 are provided below the ascending and descending ramps to guide the chain into proper engagement and disengagement with the sprockets. The drive sprocket 14 is driven by suitable variable speed motor means 72. The idler sprocket 16 is mounted on an axle 74 which is pivotally mounted at its lower end on a vertically extending support member 76 within the idler housing. The angle of the axle 74, and thus the tension of the chain 10, may be adjusted by either tightening or loosening the adjustment bolt 77 which extends between the shoe 78 of the axle and the stationary support bracket 80.

During the operation of the conveyor system the chain 10 is usually in continuous motion. Thus, successive rollers emerge from the transverse slot 82 at the base of the ascending ramp 28, travel the length of the guide track 13 and move through the transverse slot 84 at the base of the descending ramp 32. A vehicle which is to be conveyed is driven onto the conveyor so that the front and rear wheels on one side of the vehicle are positioned on the guide track 13 and that the wheels on the other side of the return track housing 41. At this point in time one of the moving rollers 12 will come into contact with either the front or rear wheel tires 86 of the vehicle, as shown in FIG. 3 and will exert a force sufficient to move the vehicle through the guide track at a speed equal to the speed of the chain.

Although but a single embodiment of the present invention has been illustrated and described, it will be apparent to those skilled in the art that various changes and modifications may be made therein without departing from the spirit of the invention or from the scope of the appended claims.

We claim:

1. A conveyor installation for conveying automotive vehicles between the entrance and exit ends of the installation, said conveyor installation comprising:
    a closed loop multidirectionally flexible chain means;
    vehicle engaging means attached to said chain means and adapted to engage a vehicle at the entrance end of the installation and to move the vehicle towards the exit end upon movement of said chain means;
    motor means connected to said chain means and operable to move said chain means and vehicle engaging means in a closed loop path between the entrance and exit ends of the installation;
    means confining said path to a loop which has:
        a. a power side which coincides with the intended path of the vehicle through the installation and in which said vehicle engaging means travels from said entrance to said exit ends;
        b. a return side in which said vehicle engaging means travels from said exit to said entrance ends and which is positioned adjacent to said power side and is located generally in the same horizontal plane as said power side; and
        c. first and second open loop sections connecting said power and return sides at said entrance and exit ends, respectively, said vehicle engaging means changing its direction of travel from a rearward travel to a forward travel at said first open loop section and from a forward travel to a rearward travel at said second open loop section; each of said open loop sections being disposed below said generally horizontal plane with said first open loop section being in a plane oblique and ascending to said generally horizontal plane and with said second open loop section being in a plane oblique to and descending from said generally horizontal plane; and
    said confining means causing said vehicle engaging means to engage a vehicle upon ascending from said first open loop section, to remain in contact with the vehicle during movement through said power side and to disengage from the vehicle upon descending along said second loop section of its path.

2. A conveyor installation according to claim 1 wherein said chain means is a coil chain and wherein said confining means includes two sprockets which limit said path to said open loop sections, one of said sprockets engaging said chain at said entrance end and the other of said sprockets engaging said chain at said exit end; and wherein said confining means further includes guide track means and return track means which confine the travel of the power and return sides of said chain to predetermined forward and return paths, respectively.

3. A conveyor installation according to claim 2 wherein said vehicle engaging means is comprised of a roller which is fixed to a link of said chain by a yoke, said yoke retaining said roller and transverse to said chain.

4. A conveyor installation according to claim 3 wherein said yoke is provided with wheels adjacent to the ends of said roller; and wherein said wheels engage and travel on rails which are provided on either side of said guide track means.

5. A conveyor installation according to claim 4 wherein said yoke is further provided with a downwardly extending leg which projects through a longitudinally extending slot of said guide track means and which terminates in a foot section which is fixed to a link of the chain.

6. A conveyor installation according to a claim 5 wherein said leg is slanted backwardly in respect to the direction of travel of said chain.